United States Patent
Pillai

(10) Patent No.: US 11,035,473 B2
(45) Date of Patent: Jun. 15, 2021

(54) INNER DIAMETER ROTATING DRUM SEAL

(71) Applicant: Cinchseal Associates, Inc., Mt Laurel, NJ (US)

(72) Inventor: Saji Pillai, Collegeville, PA (US)

(73) Assignee: CINCHSEAL ASSOCIATES, INC., Mt. Laurel, NJ (US)

( * ) Notice: Subject to any disclaimer, the term of this patent is extended or adjusted under 35 U.S.C. 154(b) by 133 days.

(21) Appl. No.: 16/537,946

(22) Filed: Aug. 12, 2019

(65) Prior Publication Data

US 2020/0049257 A1    Feb. 13, 2020

Related U.S. Application Data

(60) Provisional application No. 62/717,178, filed on Aug. 10, 2018.

(51) Int. Cl.
| | |
|---|---|
| *F16J 15/46* | (2006.01) |
| *F16J 15/3268* | (2016.01) |
| *F16J 15/3252* | (2016.01) |
| *F16J 15/34* | (2006.01) |

(52) U.S. Cl.
CPC .......... *F16J 15/46* (2013.01); *F16J 15/3252* (2013.01); *F16J 15/3268* (2013.01); *F16J 15/3448* (2013.01); *F16J 15/3464* (2013.01); *Y10S 277/903* (2013.01)

(58) Field of Classification Search
CPC .... F16J 15/164; F16J 15/3252; F16J 15/3268; F16J 15/3448; F16J 15/3464; F16J 15/40; F16J 15/46; Y10S 277/903

See application file for complete search history.

(56) References Cited

U.S. PATENT DOCUMENTS

| 2,189,686 A | 2/1940 | Stevenson |
| 2,367,403 A | 1/1945 | Kosnika |

(Continued)

FOREIGN PATENT DOCUMENTS

| GB | 1372904 A | 11/1974 |
| JP | S57195968 A | 12/1982 |

OTHER PUBLICATIONS

Int'l Preliminary Report on Patentability dated Feb. 16, 2021 in Int'l Application No. PCT/US2019/046116.

*Primary Examiner* — Nicholas L Foster
(74) *Attorney, Agent, or Firm* — Panitch Schwarze Belisario & Nadel LLP

(57) ABSTRACT

A seal for placement between a cylindrical shaft and a drum rotatably mounted with respect thereto includes an outside end member with a shaft section, a bore and a gas input connection and an inside end member non-rotatably attached thereto and configured to engage the shaft section. An outer end seal and an inner end seal are slidably and rotatably engaged with the shaft section. A circumferential seal is configured to non-rotatably engage with the outer and inner end seals. An interference fit is formed in the axial direction between an inner assembly, comprising the circumferential seal and the outer and inner end seals, and the outside and inside end members. An interference fit also is formed radially between the circumferential seal and a drum of a mixing machine. A method provides a seal for placement between a cylindrical shaft and a drum rotatably mounted with respect to the shaft.

12 Claims, 7 Drawing Sheets

(56) References Cited

U.S. PATENT DOCUMENTS

| | | | |
|---|---|---|---|
| 2,500,295 A * | 3/1950 | Peirce | F16J 15/40 |
| | | | 422/209 |
| 2,561,694 A | 7/1951 | Gilbert | |
| 2,586,739 A | 2/1952 | Summers | |
| 2,888,281 A | 5/1959 | Ratti | |
| 3,013,830 A | 12/1961 | Milligan | |
| 3,351,350 A | 11/1967 | Shepler | |
| 3,722,895 A * | 3/1973 | Mevissen | F16J 15/46 |
| | | | 277/583 |
| 3,770,284 A | 11/1973 | Galloway | |
| 3,940,154 A | 2/1976 | Olsson | |
| 3,988,026 A | 10/1976 | Kemp, Jr. | |
| 4,099,728 A | 7/1978 | Wiese | |
| 4,305,592 A | 12/1981 | Peterson | |
| 4,342,336 A * | 8/1982 | Satterthwaite | F16L 55/134 |
| | | | 138/90 |
| 4,358,119 A | 11/1982 | Kryczun | |
| 4,394,021 A * | 7/1983 | Media | F16J 15/24 |
| | | | 277/389 |
| 4,809,992 A | 3/1989 | Kemp, Jr. et al. | |
| 4,817,966 A | 4/1989 | Borowski | |
| 5,024,450 A | 6/1991 | Hawley et al. | |
| 5,039,111 A | 8/1991 | Kemp, Jr. | |
| 5,114,054 A * | 5/1992 | Watson | F16J 15/46 |
| | | | 222/386 |
| 5,125,672 A | 6/1992 | Wycliffe | |
| 5,409,240 A | 4/1995 | Ballard | |
| 6,098,753 A | 8/2000 | Lamarre et al. | |
| 6,186,510 B1 | 2/2001 | Reagan | |
| 6,224,063 B1 | 5/2001 | Faass | |
| 6,247,702 B1 | 6/2001 | Long et al. | |
| 7,178,806 B1 | 2/2007 | Pitchko et al. | |
| 10,563,763 B1 * | 2/2020 | DeJohn | B65D 88/60 |
| 2004/0130100 A1 * | 7/2004 | Oram | F16J 15/3448 |
| | | | 277/358 |

\* cited by examiner

INNER DIAMETER ROTATING DRUM SEAL

CROSS-REFERENCE TO RELATED APPLICATIONS

This application claims the benefit of priority under 35 USC § 119(e) of U.S. Provisional Patent Application No. 62/717,178 filed Aug. 10, 2018, the contents of which are incorporated herein by reference.

BACKGROUND

Embodiments of the present invention relate to a drum seal, particularly to an inner diameter rotating drum seal for fixed-shaft applications.

In a modern industrial world, a wide variety of industries, such as food processing, cement production, and pharmaceutical production, require advanced mixing equipment as part of the manufacturing process. In order to avoid loss of material during processing, conventional seals are often placed between the rotating and stationary portions of such equipment. The use of seals may reduce manufacturing costs through material recapture and may increase environmental safety for plant employees. However, conventional seals have several drawbacks. Many conventional seals, such as mechanically packed seals, are ineffective at preventing loss of material and require constant maintenance. Other conventional seals, such as a packing gland or a split gland seal, utilize a compressed packing. However, such gland seals are designed to wear over time, thereby requiring frequent repacking and having a relatively short service life. In addition, such conventional seals cannot take or adjust to large shaft runouts and do not form a continuous seal, with gaps in the discontinuous seals providing a path through which material may escape.

Presently disclosed is an improved drum seal, which in certain embodiments may overcome the aforementioned shortcomings of the prior art. Certain embodiments may provide an effective, radial runout tolerant, continuous seal, which may be used advantageously for mixing applications with rotating drums and fixed shafts.

BRIEF SUMMARY OF THE INVENTION

Briefly stated, an example of a seal for placement between a cylindrical shaft and a drum rotatably mounted with respect to the shaft comprises an outside end member. The outside end member has an outer disk section, an inwardly extending shaft section, and an axial bore extending therethrough. The axial bore is sized to surround and engage the shaft. The outside end member has a pressurized-fluid connection comprising a fluid passage passing through the outer disk section. An inside end member is axially aligned with and non-rotatably attached with respect to the outside end member. The inside end member is configured to be axially aligned with and non-rotatably attached with respect to the shaft. The inside end member has a central hole aligned with and equal in diameter to the axial bore of the inwardly extending shaft section of the outside end member. A circumferential seal comprises an annular body with an inner circumferential surface and an axially aligned annular ridge extending radially inwardly from an axially central portion of the inner circumferential surface and having two oppositely and transversely oriented transverse ridge surfaces orthogonal to an axis of the annular body. End-seal engagement features extend radially inwardly from the inner circumferential surface adjacent to the transverse ridge surfaces. An outer end seal comprises an axially aligned ring section, an axially aligned cylindrical mating section extending inwardly from the ring section, and a central, axially aligned through-hole extending through the ring section and the mating section. The through-hole has an inner diameter at least slightly larger than the outer diameter of the shaft section of the outside end member. The through-hole forms a gap between the through-hole and the shaft section of the outside end member, and the gap is in fluid communication with the pressurized-fluid connection of the outside end member. The mating section comprises circumferential-seal engagement features circumferentially spaced apart around the mating section. Each circumferential-seal engagement feature is configured to engage at least one complementary end-seal engagement feature of the circumferential seal. An inner end seal comprises an axially aligned ring section, an axially aligned cylindrical mating section extending outwardly from the ring section, and a central, axially aligned through-hole extending through the ring section and the mating section. The through-hole has an inner diameter at least slightly larger than the outer diameter of the shaft section of the outside end member. The through-hole forms a gap between the through-hole and the shaft section of the outside end member, and the gap is in fluid communication with the pressurized-fluid connection of the outside end member. The mating section comprises circumferential-seal engagement features circumferentially spaced apart around the mating section. Each circumferential-seal engagement feature is configured to engage with at least one end-seal engagement feature of the circumferential seal. The end-seal engagement features and the circumferential-seal engagement features cooperate to prevent relative movement between the circumferential seal and the outer end seal, and between the circumferential seal and the inner end seal. An inner assembly comprises the outer end seal, the circumferential seal, and the inner end seal. The inner assembly has an inner-assembly axial dimension greater than a corresponding axial dimension of the shaft section of the outside end member, so that the outer end seal and the inner end seal engage the outside end member and the inside end member in an interference fit in the axial direction. The circumferential seal has an outer diameter greater than an inner diameter of the drum so that the circumferential seal engages the drum in an interference fit in the radial direction.

Any embodiment of the seal may include at least one end-seal engagement feature comprising one of a lug and a protrusion, and at least one circumferential-seal engagement feature comprising a recess.

Any embodiment of the seal may include at least one end-seal engagement feature comprising a recess and at least one circumferential-seal engagement feature comprising one of a lug and a protrusion.

Any embodiment of the seal may include the end-seal engagement features being circumferentially equally spaced apart around the annular ridge.

Any embodiment of the seal may include the circumferential-seal engagement features being circumferentially equally spaced apart around the mating section of at least one of the outer end seal and the inner end seal.

Any embodiment of the seal may include the inside end member being disk shaped.

Any embodiment of the seal may include at least one of a screw and a bolt securing the outside end member and the inside end member together.

Any embodiment of the seal may include a compressed-gas source fluidly connected to the pressurized-fluid connection.

Any embodiment of the seal may include the pressurized-fluid connection comprising an American National Standard Taper Pipe Thread connection.

Any embodiment of the seal may include at least one of the outside end member and the inside end member comprising a metallic material.

Any embodiment of the seal may include at least one of the outer end seal and the inner end seal comprises a polymeric material.

An example of a method of providing a seal for placement between a cylindrical shaft, the shaft having a shaft base, and a drum rotatably mounted with respect to the shaft, may include the following steps:

securing an inside end member non-rotatably to the shaft base, the inside end member being axially aligned with and non-rotatably attached with respect to the shaft, the inside end member having a central hole aligned with and equal in diameter to the axial bore of the inwardly extending shaft section of the outside end member;

engaging a circumferential seal with an outer end seal and an inner end seal to form an inner assembly, wherein: the circumferential seal comprises an annular body with an inner circumferential surface and an axially aligned annular ridge, the ridge extending radially inwardly from an axially central portion of the inner circumferential surface and having two oppositely and transversely oriented transverse ridge surfaces orthogonal to an axis of the annular body, and end-seal engagement features extending radially inwardly from the inner circumferential surface adjacent to the transverse ridge surfaces; the outer end seal comprises an axially aligned ring section, an axially aligned cylindrical mating section extending inwardly from the ring section, and a central, axially aligned through-hole extending through the ring section and the mating section, the through-hole having an inner diameter at least slightly larger than the outer diameter of the shaft section of the outside end member and forming a gap between the through-hole and the shaft section of the outside end member, the gap being in fluid communication with the pressurized-fluid connection of the outside end member, the mating section comprising circumferential-seal engagement features circumferentially spaced apart around the mating section, each circumferential-seal engagement feature being configured to engage at least one end-seal engagement feature of the circumferential seal; the inner end seal comprises an axially aligned ring section, an axially aligned cylindrical mating section extending outwardly from the ring section, and a central, axially aligned through-hole extending through the ring section and the mating section, the through-hole having an inner diameter at least slightly larger than the outer diameter of the shaft section of the outside end member and forming a gap between the through-hole and the shaft section of the outside end member, the gap being in fluid communication with the fluid-input connection of the outside end member, the mating section comprising circumferential-seal engagement features circumferentially spaced apart around the mating section and configured to engage with at least one end-seal engagement feature of the circumferential seal; the end-seal engagement features and the circumferential-seal engagement features cooperate to prevent relative movement between the circumferential seal and the outer end seal, and between the circumferential seal and the inner end seal; and the circumferential seal has an outer diameter greater than an inner diameter of the drum;

slidably engaging the inner assembly with an outside end member having an outer disk section, an inwardly extending shaft section having an axial bore extending through the outer disk section and the shaft section, the bore being sized to surround and engage the shaft, and the shaft section having an axial dimension at least slightly less than a corresponding axial dimension of the inner assembly, so that the outer end seal and the inner end seal engage the outside end member and the inside end member in an interference fit in the axial direction, the outside end member having a pressurized-fluid connection comprising a fluid passage passing through the outer disk section;

aligning the outside end member, with the inner assembly engaged on the shaft section, with the inside end member;

forcing the outside end member axially toward the inside end member, engaging the circumferential seal with the drum in an interference fit in the radial direction; and fluidly connecting a compressed-gas source to the pressurized-fluid connection of the outside end member;

the method being performed such that upon a rotation of the drum about the shaft, the circumferential seal, the outer end seal, and the inner end seal rotate with the drum about the shaft, while the outside end member and the inside end member remain stationary with respect to the shaft.

The method may be performed using at least any of the components described herein.

BRIEF DESCRIPTION OF THE SEVERAL VIEWS OF THE DRAWINGS

The following detailed description of an example of a seal will be better understood when read in conjunction with the appended drawings. For the purpose of illustrating an example of the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
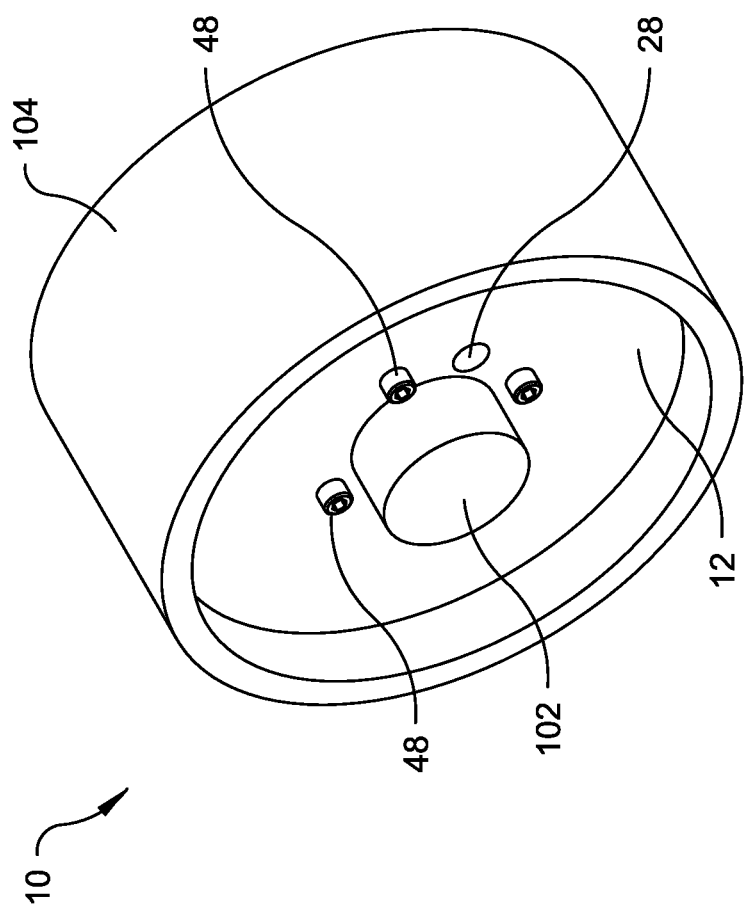
FIG. 1 is a front and top perspective view of a preferred embodiment of the inner diameter drum seal according to the present invention.
Figure 2:
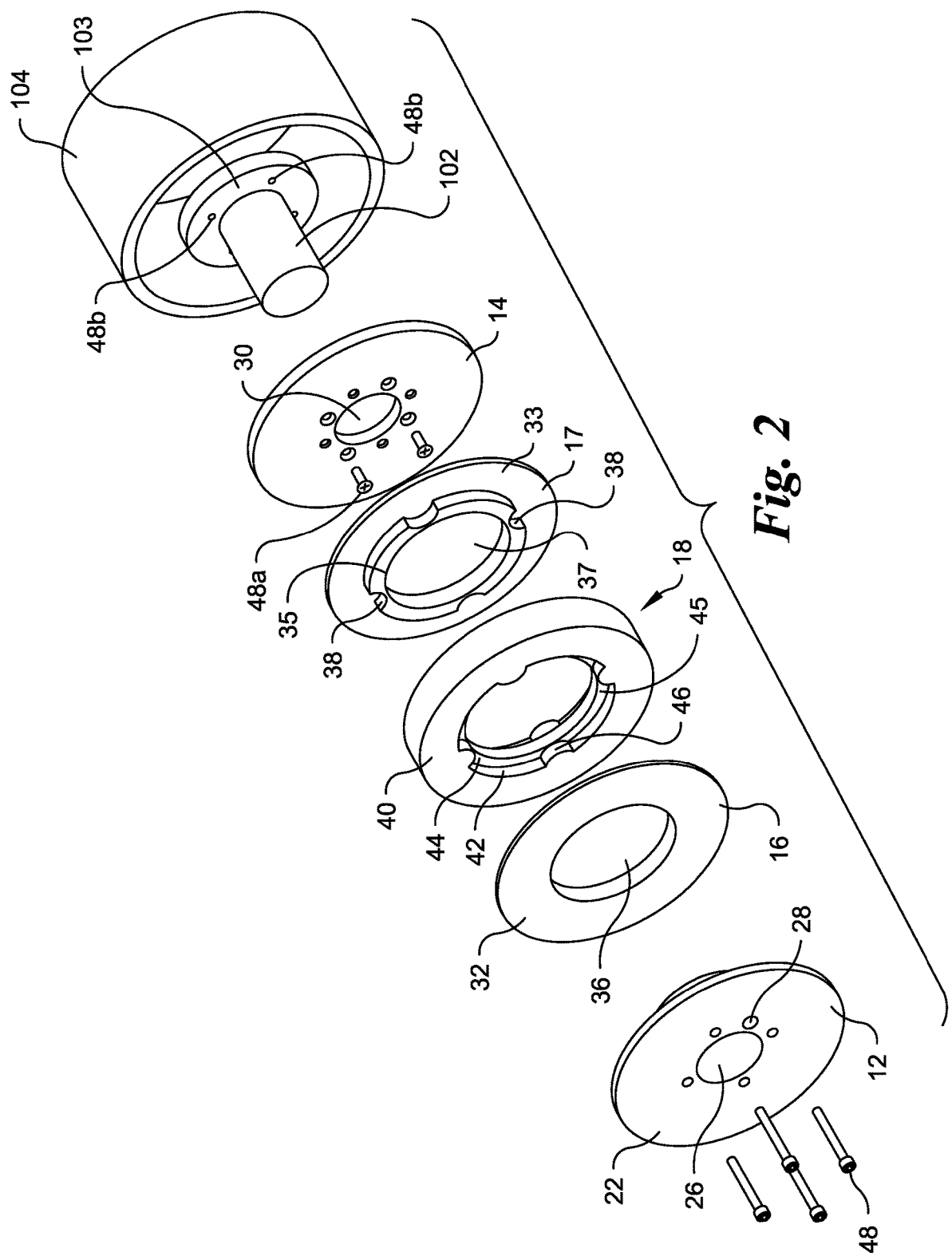
FIG. 2 is an exploded front and top perspective view of the drum seal of FIG. 1.
Figure 3:
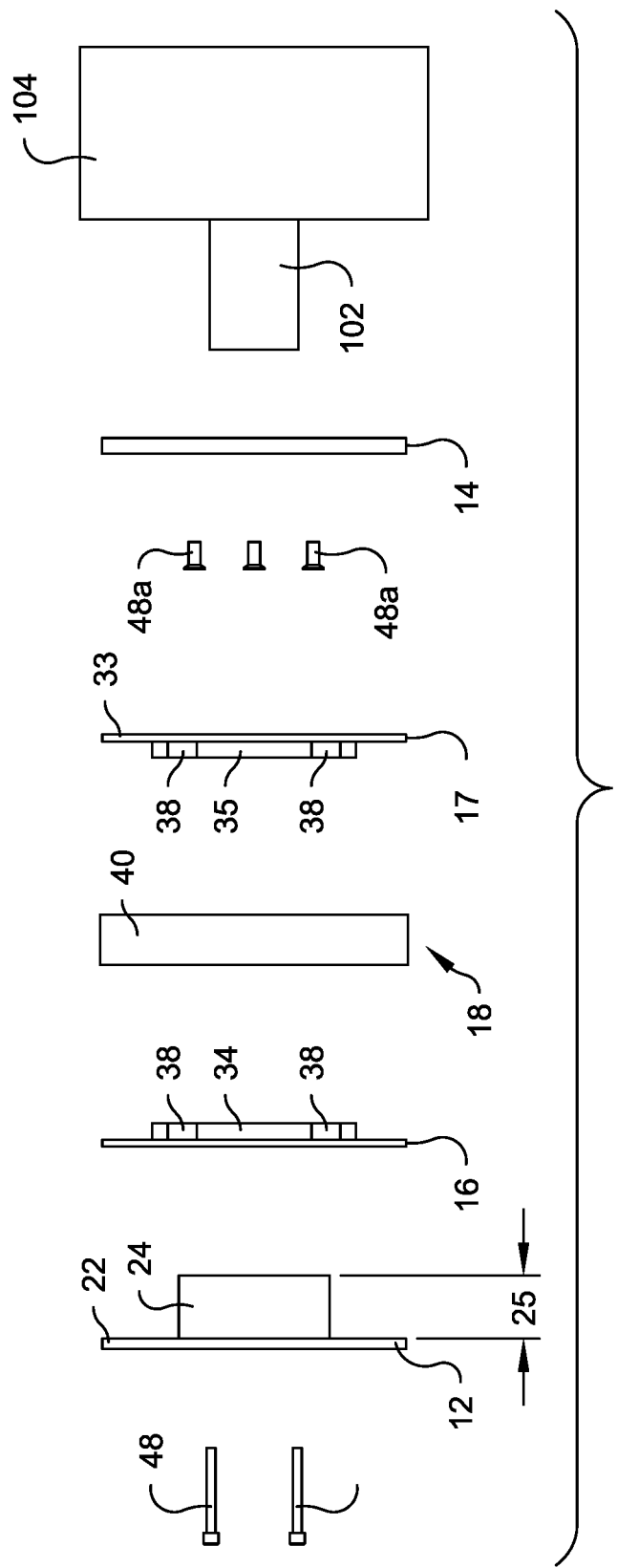
FIG. 3 is an exploded side elevational view of the drum seal of FIG. 1.
Figure 4:
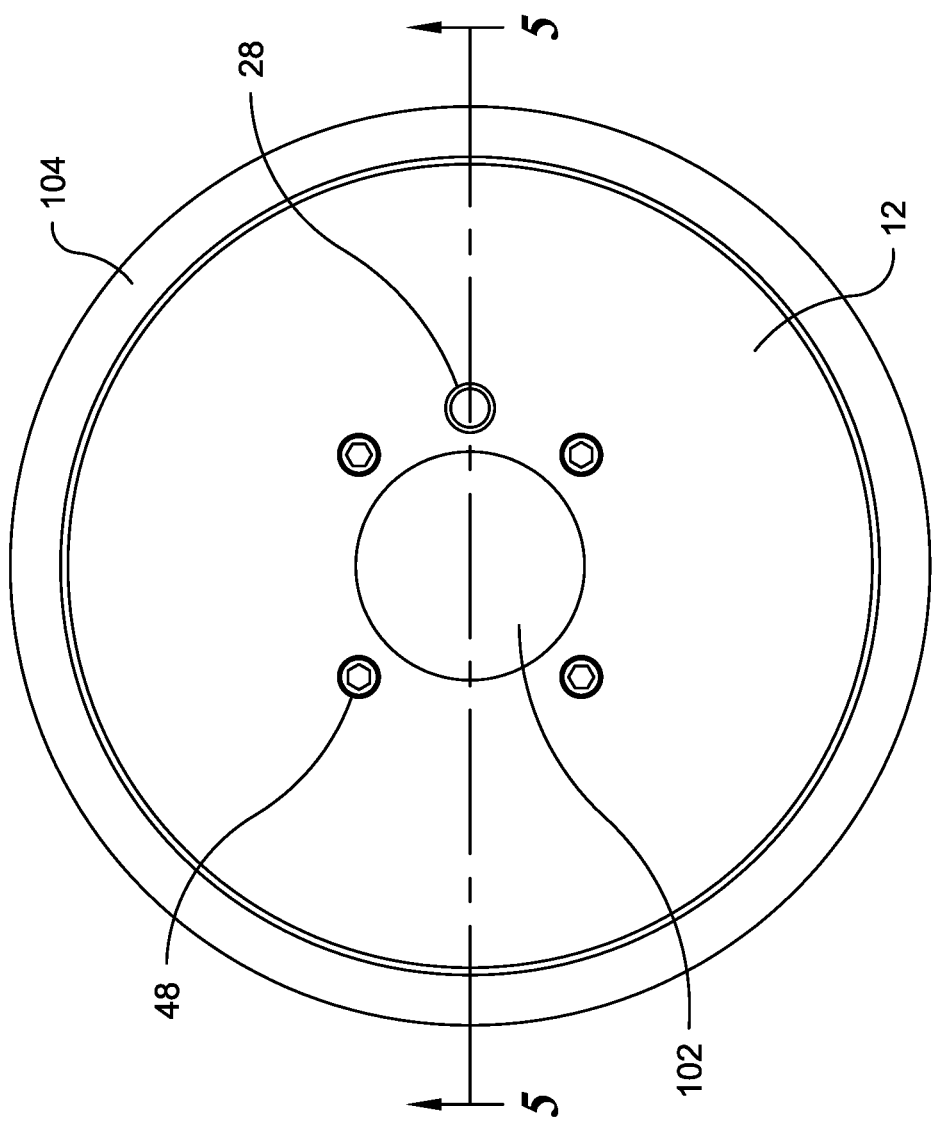
FIG. 4 is a front elevational view of the drum seal of FIG. 1.

Reference will now be made in detail to an examples of drum seals, which are illustrated in the accompanying drawings. The terminology used in the description of the invention herein is for the purpose of describing the particular embodiment only and is not intended to be limiting.

As used in the description below, the singular forms "a," "an," and "the" are intended to include the plural forms as well, unless the context clearly indicates otherwise. The words "and/or" as used herein refers to and encompasses any and all possible combinations of one or more of the associated listed items. The words "comprises" and/or "comprising," when used herein, specify the presence or the stated features, integers, steps, operations, elements, components, and/or groups, but do not preclude the presence or addition of one or more other features, integers, steps, operations, elements, components, and/or groups thereof.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The words "right," left," "lower," "upper," "front" and "rear" designate directions in the drawings to which reference is made. The words "inwardly" and "outwardly" refer to directions toward and away from, respectively, the geometric center of the seal, and designated parts thereof. The terminology includes the words noted above, derivatives thereof, and words of similar import.

Although the words first, second, etc., are used herein to describe various elements, these elements should not be limited by these words. These words are only used to distinguish one element from another. For example, a first end could be termed a second end without departing from the scope of the present invention.

Referring to the drawings in detail, wherein like numerals indicate like elements throughout, in FIGS. 1-7, a seal, in particular a drum seal, generally designated 10, is shown. The drum seal 10 may be used for placement between a cylindrical shaft 102, which may have an integrally formed shaft base 103, and a drum 104, which may be rotatably mounted with respect to the shaft 102. The drum seal 10 comprises an outside end member 12, an inside end member 14, an outer end seal 16, an inner end seal 17, and a circumferential seal 18, all of which may be arranged with respect to each other in the axial direction. The outside end member 12 preferably has an outer disk section 22 lying in a plane orthogonal to the axial direction and an inwardly extending cylindrical shaft section 24 extending axially inwardly from the disk section 22. The outside end member 12 may further have an axial bore 26 (see FIG. 2) extending axially and completely through the radial center of the disk section 22 and the shaft section 24, so that the axial bore 26 extends through the outside end member 12. The bore 26 is preferably sized to allow the shaft section 24 to surround and engage a cylindrical, stationary shaft 102 of a mixing machine (not shown). The outside end member 12 is preferably made from a metallic material, such as steel, but may be made of any suitable material known in the art for the intended application of the machine for which the seal 10 is used.

The outside end member 12 further may include a pressurized-fluid connection 28 comprising a fluid passage 29 passing through the disk section 22. The pressurized-fluid connection 28 is preferably configured to engage and fluidly connect with a compressed-gas source, such as gas tube 29a (shown in phantom in FIG. 5), for inserting gas under pressure into the drum seal 10. The gas supplied to the drum seal 10 may be any suitable gas, but is preferably compressed or pressurized air. The pressurized-fluid connection 28 may comprise an American National Standard Taper Pipe Thread connection, but may be any suitable connection that is known in the art.

The inside end member 14 may be configured to be axially aligned with and non-rotatably attached with respect to the outside end member 12. The inside end member 14 may have a central hole 30 aligned with and equal in diameter to the axial bore 26 of the inwardly extending shaft section 24 of the outside end member 12. The inside end member 14 may be disk shaped, but may be any suitable shape known in the art. The inside end member 14 may be secured to the outside end member 12 to hold together the components of the drum seal 10, preferably by screws or bolts 48a, although the inside end member 14 may be secured to the outside end member 12 by any suitable fastening means known in the art. The inside end member 14 is further preferably secured to the stationary shaft 102, preferably by screws or bolts 48, although the inside end member 14 may be secured to the stationary shaft 102 by any suitable fastening means known in the art. The inside end member 14 is preferably made from a metallic material, such as steel, but may be made of any suitable material known in the art.

Figure 5:
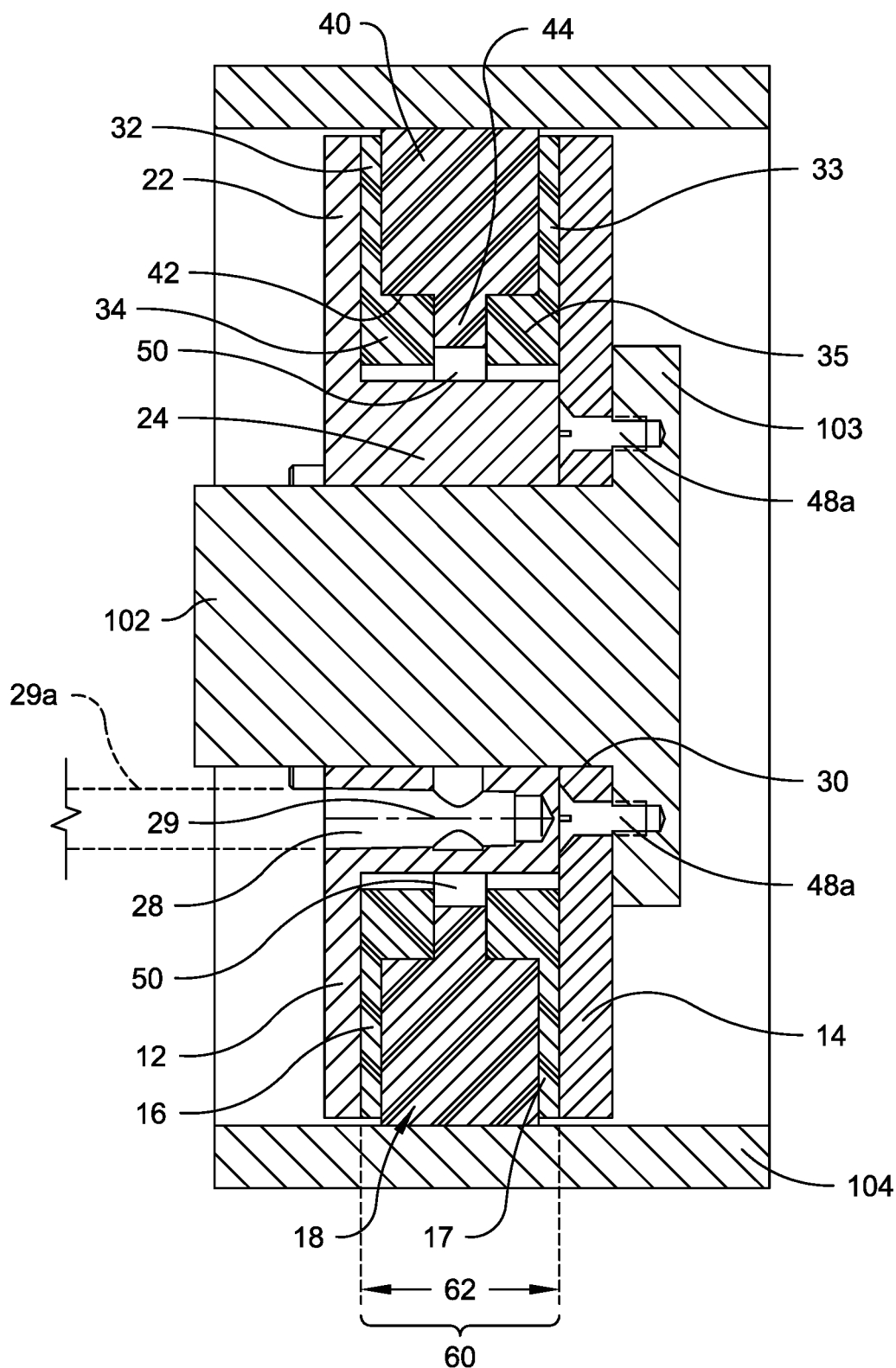
FIG. 5 is an enlarged sectional top plan view of the drum seal taken along line 5-5 of FIG. 4.
Figure 6:
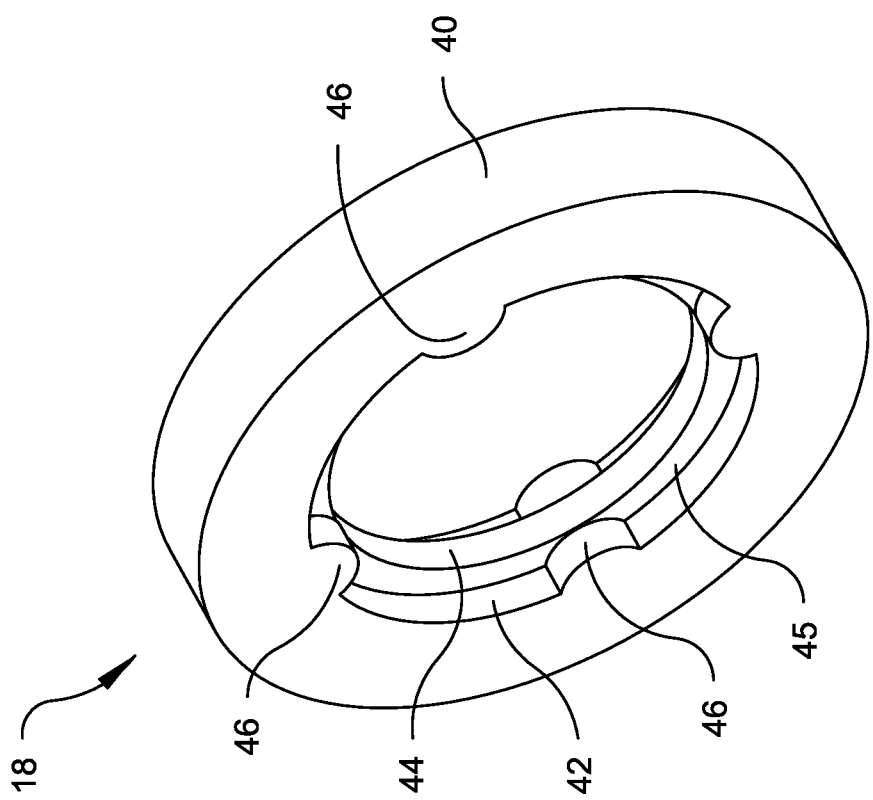
FIG. 6 is a front and top perspective view of a circumferential seal of the drum seal of FIG. 1.
Figure 7:
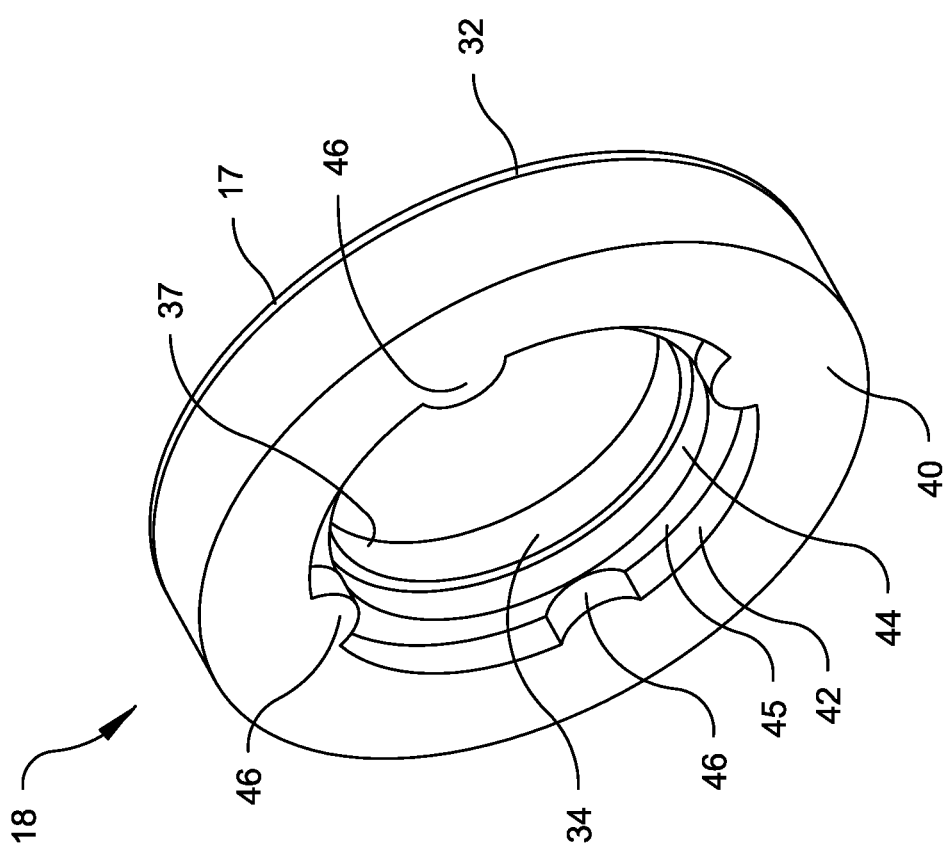
FIG. 7 is a front and top perspective view of a circumferential seal and an end seal of the drum seal of FIG. 1.

The outer end seal 16 may comprise an axially aligned ring section 32, an axially aligned cylindrical mating section 34 extending axially inwardly from the ring section 32, and a central, axially aligned through-hole 36 extending through the ring section 32 and the mating section 34. The through-hole 36 may have an inner diameter at least slightly larger than the outer diameter of the shaft section 24 of the outside end member 12 and may form a gap (the gap being a portion of a gap 50, as shown in FIG. 5) between the through-hole 36 and the shaft section 24 of the outside end member 12. The gap 50 (and each portion thereof) may be in fluid communication with the pressurized-fluid connection 28 of the outside end member 12. The mating section 34 may comprise circumferential-seal engagement features 38, which may be circumferentially spaced apart, preferably equally, around the mating section 34, with each circumferential-seal engagement 38 feature being configured to engage at least one complementary end-seal engagement feature 46 of the circumferential seal 18. The circumferential-seal engagement features 38 may be indents or recesses, but may be any suitable engagement feature known in the art, with at least one end-seal engagement feature 46 being a lug or protrusion. Alternatively, or in addition, at least one circumferential-seal engagement feature 38 may be a lug or protrusion, with at least one end-seal engagement feature 46 being an indent or recess. The outer end seal 16 and the inner end seal 17 may preferably be made from a polymeric material, but may be made of any suitable material known in the art.

The inner end seal 17 may comprise an axially aligned ring section 33, an axially aligned cylindrical mating section 35, extending axially outwardly from the ring section 33, and a central, axially aligned through-hole 37 extending through the ring section 33 and the mating section 35. The through-hole 37 may have an inner diameter at least slightly larger than the outer diameter of the shaft section 24 of the outside end member 12 and may form a gap (the gap being a portion of the gap 50, as shown in FIG. 5) between the through-hole 37 and the shaft section 24 of the outside end member 12. The mating section 35 may comprise circumferential-seal engagement features 38, which may be circumferentially spaced apart, preferably equally, around the mating section 35. Each circumferential-seal engagement feature 38 may be configured to engage with at least one end-seal engagement feature 46 of the circumferential seal 18.

The circumferential seal 18 may comprise an annular body 40 with an inner circumferential surface 42. An annular ridge 44 may extend radially inwardly from an axially central portion of the inner circumferential surface 42, which may be proximate to the axial center of the circumferential seal 18. The annular ridge 44 may have two oppositely and transversely oriented transverse ridge surfaces 45, which may be oriented orthogonally to the axis of the annular body 40. The annular body 40 may have end-seal engagement features 46, which may extend radially inwardly from the inner circumferential surface 42 adjacent to both transverse ridge surfaces 45 of the ridge 44. The end-seal engagement features 46 may be spaced apart around the annular ridge 44, preferably equally. Each end-seal engagement feature 46 may comprise one of a lug or a protrusion which is located, sized, and complimentarily shaped to engage with and lock into a corresponding circumferential-seal engagement feature 38 on the outer end seal 16 or the inner end seal 17. The engagement between the circumferential-seal and end-seal engagement features 38, 46 may lock the outer end seal 16 and the inner end seal 17 to the circumferential seal 18 and may prevent relative circumferential movement between the outer end seal 16 and the circumferential seal 18, and between the inner end seal 17 and the circumferential seal 18, when the drum seal 10 is assembled. The circumferential seal 18 may preferably be made of an elastomeric material, but may be made of any suitable material well known in the art.

An inner assembly 60 (FIG. 5) comprising the outer end seal 16, the circumferential seal 18, and the inner end seal 17 may have an inner-assembly axial dimension 62 greater than a corresponding axial dimension 25 (FIG. 3) of the shaft section 24 of the outside end member 12, so that the outer end seal 16 and the inner end seal 17 engage the outside end member 12 and the inside end member 14 in an interference fit in the axial direction. The circumferential seal 18 may have an outer diameter greater than an inner diameter of the drum 104 so that the circumferential seal 18 engages the drum 104 in an interference fit in the radial direction (see FIG. 5).

The drum seal 10 may be assembled by securing the inside end member 14 to the stationary shaft 102 of the mixing machine by screws or bolts 48a. The outer end seal 16 and the inner end seal 17 may be mated with the circumferential seal 18, such that the circumferential-seal engagement features 38 and the end-seal engagement features 46 are engaged to prevent relative movement between the circumferential seal 18 and each of the end seals 16, 17 (see FIG. 7). The seals 16, 17, 18 may then be slidably engaged with the shaft section 24 of the outside end member 12. The outside end member 12, the outer end seal 16, the circumferential seal 18, and the inner end seal 17, may then be secured to the inside end member 14 by screws or bolts 48 passing through the shaft section 24 of the outside end member 12. When installed, the outer circumferential surface of the circumferential seal 18 may engage a rotating drum 104 of the mixing machine.

Further, the circumferential seal 18 may have an outer diameter at least slightly greater than an inner diameter of the rotating drum 104 such that the circumferential seal 18 may be in an interference fit in the radial direction with the rotating drum 104. Further, because the diameter of the through hole 36 in certain embodiments may be at least slightly larger than the outer diameter of the shaft section 24, a gap 50 may be formed between the seals 16, 17, 18 and the shaft section 24 when the drum seal 10 is assembled (see FIG. 5).

In operation, the drum seal 10 is fixedly engaged to the stationary shaft 102 through screws or bolts 48a extending through the inside end member 14 and engaging bushings 48b on the shaft base 103 of the stationary shaft 102, such that the drum seal 10 does not move axially relative to the stationary shaft 102 and the outside end member 12 and the inside end member 14 do not rotate with respect to the stationary shaft 102. Due to the radial interference fit, the circumferential seal 18 and the engaged end seals 16, 17 rotate with the drum 104. To maintain a secure engagement of the seals 16, 17, 18 with both the end members 12, 14 and the drum 104, gas under pressure may be constantly supplied via the pressurized-fluid connection 28 into the gap 50 between the seals 16, 17, 18 and the shaft section 24 of the outside end member 12. The pressure of the gas may press the outer end seal 16 and the inner end seal 17 against the end members 12, 14 and may press the circumferential seal 18 against the drum 104 for a tight fit. As the seals 16, 17, 18 degrade over time, the gas pressure may maintain a firm seal. The radial interference fit between the circumferential seal 18 and the rotating drum 104 prevents the escape of material from the mixing machine. The axial interference fit between the outer end seal 16 and the inner end seal 17 and the end members 12, 14 also prevents material from entering into the drum seal 10 and degrading the parts and function of the drum seal 10.

A method of providing a seal 10 for placement between a cylindrical shaft 102, the shaft having a shaft base 103, and a drum 104 rotatably mounted with respect to the shaft 102, may include the following steps:

securing an inside end member 14 non-rotatably to the shaft base 103, the inside end member 14 being axially aligned with and non-rotatably attached with respect to the shaft 102, the inside end member 14 having a central hole 30 aligned with and equal in diameter to the axial bore 26 of the inwardly extending shaft section 24 of the outside end member 12;

engaging a circumferential seal 18 with an outer end seal 16 and an inner end seal 17 to form an inner assembly 60, wherein the circumferential seal 18 comprises an annular body 40 with an inner circumferential surface 42 and an axially aligned annular ridge 44, the ridge 44 extending radially inwardly from an axially central portion of the inner circumferential surface 42 and having two oppositely and transversely oriented transverse ridge surfaces 45 orthogonal to an axis of the annular body 40, and end-seal engagement features 46 extending radially inwardly from the inner circumferential surface 42 adjacent to the transverse ridge surfaces 45; the outer end seal 16 comprises an axially aligned ring section 32, an axially aligned cylindrical mating section 34 extending axially inwardly from the ring section 32, and a central, axially aligned through-hole 36 extending axially through the ring section 32 and the mating section 34, the through-hole 36 having an inner diameter at least slightly larger than the outer diameter of the shaft section 24 of the outside end member 12 and forming a gap or portion of a gap 50 between the through-hole 36 and the shaft section 24 of the outside end member 24, the gap 50 being in fluid communication with the pressurized-fluid connection 28 of the outside end member 12, the mating section 34 comprising circumferential-seal engagement features 38 circumferentially spaced or circumferentially equally spaced apart around the mating section 34, each circumferential-seal engagement feature 38 being configured to engage at least one end-seal engagement feature 46 of the circumferential seal 18; the inner end seal 17 comprises an axially aligned ring section 33, an axially aligned cylindrical mating section 35 extending axially outwardly from the ring section 33, and a central, axially aligned through-hole 37 extending axially through the ring section 33 and the mating section 35, the through-hole 37 having an inner diameter at least slightly larger than the outer diameter of the shaft section 24 of the outside end member 12 and forming a gap or a portion of a gap 50 between the through-hole 37 and the shaft section 24 of the outside end member 12, the gap 50 being in fluid communication with the fluid-input connection 28 of the outside end member 12, the mating section 35 comprising circumferential-seal engagement features 38 circumferentially spaced apart around the mating section 35 and configured to engage with at least one end-seal engagement feature 46 of the circumferential seal 18; the end-seal engagement features 46 and the circumferential-seal engagement features 38 cooperating to prevent relative movement between the circumferential seal 18 and the outer end seal 16, and between the circumferential seal 18 and the inner end seal 17; and the circumferential seal 18 having an outer diameter greater than an inner diameter of the drum 104;

slidably engaging the inner assembly 60 with an outside end member 12 having an outer disk section 22, an axially inwardly extending shaft section 24 having an axial bore 26 extending axially through the outer disk section 22 and the shaft section 24, the bore 26 being sized to surround and engage the shaft 102, and the shaft section 24 having an axial dimension at least slightly less than a corresponding axial dimension 62 of the inner assembly 60, so that the outer end seal 16 and the inner end seal 17 respectively engage the outside end member 12 and the inside end member 14 in an interference fit in the axial direction, the outside end member 12 having a pressurized-fluid connection 28 comprising a fluid passage 29 passing through the outer disk section 22;

aligning the outside end member 12, with the inner assembly 60 engaged on the shaft section 24, with the inside end member 14;

forcing the outside end member 12 axially toward the inside end member 14, engaging the circumferential seal 18 with the drum 104 in an interference fit in the radial direction; and fluidly connecting a compressed-gas source 29a to the pressurized-fluid connection 28 of the outside end member 12.

The seal 10 may be assembled such that upon a rotation of the drum 104 about the shaft 102, the circumferential seal 18, the outer end seal 16, and the inner end seal 17 rotate with the drum 104 about the shaft 102, while the outside end member 12 and the inside end member 14 remain stationary with respect to the shaft 102. Note that any components used in practicing the method above, but having additional characteristics described herein, may also be used in practicing the method described above.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention.

I claim:

1. A seal for placement between a cylindrical shaft and a drum rotatably mounted with respect to the shaft, the seal comprising:
   an outside end member having an outer disk section, an inwardly extending shaft section, and an axial bore extending therethrough, the axial bore being sized to surround and engage the shaft, and the outside end member having a pressurized-fluid connection comprising a fluid passage passing through the outer disk section;
   an inside end member axially aligned with and non-rotatably attached with respect to the outside end member, the inside end member being configured to be axially aligned with and non-rotatably attached with respect to the shaft, the inside end member having a central hole aligned with and equal in diameter to the axial bore of the inwardly extending shaft section of the outside end member;
   a circumferential seal comprising an annular body with an inner circumferential surface and an axially aligned annular ridge extending radially inwardly from an axially central portion of the inner circumferential surface and having two oppositely and transversely oriented transverse ridge surfaces orthogonal to an axis of the annular body, and end-seal engagement features extending radially inwardly from the inner circumferential surface adjacent to the transverse ridge surfaces;
   an outer end seal comprising an axially aligned ring section, an axially aligned cylindrical mating section extending inwardly from the ring section, and a central, axially aligned through-hole extending through the ring section and the mating section, the through-hole having an inner diameter at least slightly larger than the outer diameter of the shaft section of the outside end member and forming a gap between the through-hole and the shaft section of the outside end member, the gap being in fluid communication with the pressurized-fluid connection of the outside end member, the mating section comprising circumferential-seal engagement features circumferentially spaced apart around the mating section, each circumferential-seal engagement feature being configured to engage at least one complementary end-seal engagement feature of the circumferential seal;
   an inner end seal comprising an axially aligned ring section, an axially aligned cylindrical mating section extending outwardly from the ring section, and a central, axially aligned through-hole extending through the ring section and the mating section, the through-hole having an inner diameter at least slightly larger than the outer diameter of the shaft section of the outside end member and forming a gap between the through-hole and the shaft section of the outside end member, the gap being in fluid communication with the pressurized-fluid connection of the outside end member, the mating section comprising circumferential-seal engagement features circumferentially spaced apart around the mating section, each circumferential-seal engagement feature being configured to engage with at least one end-seal engagement feature of the circumferential seal;
   wherein the end-seal engagement features and the circumferential-seal engagement features cooperate to prevent relative movement between the circumferential seal and the outer end seal, and between the circumferential seal and the inner end seal;
   wherein an inner assembly comprising the outer end seal, the circumferential seal, and the inner end seal has an inner-assembly axial dimension greater than a corresponding axial dimension of the shaft section of the outside end member, so that the outer end seal and the inner end seal engage the outside end member and the inside end member in an interference fit in the axial direction; and wherein the circumferential seal has an outer diameter greater than an inner diameter of the drum so that the circumferential seal engages the drum in an interference fit in the radial direction.

2. The seal of claim 1, wherein at least one end-seal engagement feature comprises one of a lug and a protrusion, and at least one circumferential-seal engagement feature comprises a recess.

3. The seal of claim 1, wherein at least one end-seal engagement feature comprises a recess and at least one circumferential-seal engagement feature comprises one of a lug and a protrusion.

4. The seal of claim 1, wherein the end-seal engagement features are circumferentially equally spaced apart around the annular ridge.

5. The seal of claim 1, wherein the circumferential-seal engagement features are circumferentially equally spaced apart around the mating section of at least one of the outer end seal and the inner end seal.

6. The seal of claim 1, wherein the inside end member is disk shaped.

7. The seal of claim 1, further comprising at least one of a screw and a bolt securing the outside end member and the inside end member together.

8. The seal of claim 1, further comprising a compressed-gas source fluidly connected to the pressurized-fluid connection.

9. The seal of claim 1, wherein the pressurized-fluid connection comprises an American National Standard Taper Pipe Thread connection.

10. The seal of claim 1, wherein at least one of the outside end member and the inside end member comprises a metallic material.

11. The seal of claim 1, wherein at least one of the outer end seal and the inner end seal comprises a polymeric material.

12. A method of providing a seal for placement between a cylindrical shaft, the shaft having a shaft base, and a drum rotatably mounted with respect to the shaft, comprising:

securing an inside end member non-rotatably to the shaft base, the inside end member being axially aligned with and non-rotatably attached with respect to the shaft, the inside end member having a central hole aligned with and equal in diameter to the axial bore of the inwardly extending shaft section of the outside end member;

engaging a circumferential seal with an outer end seal and an inner end seal to form an inner assembly, wherein:

the circumferential seal comprises an annular body with an inner circumferential surface and an axially aligned annular ridge, the ridge extending radially inwardly from an axially central portion of the inner circumferential surface and having two oppositely and transversely oriented transverse ridge surfaces orthogonal to an axis of the annular body, and end-seal engagement features extending radially inwardly from the inner circumferential surface adjacent to the transverse ridge surfaces;

the outer end seal comprises an axially aligned ring section, an axially aligned cylindrical mating section extending inwardly from the ring section, and a central, axially aligned through-hole extending through the ring section and the mating section, the through-hole having an inner diameter at least slightly larger than the outer diameter of the shaft section of the outside end member and forming a gap between the through-hole and the shaft section of the outside end member, the gap being in fluid communication with the pressurized-fluid connection of the outside end member, the mating section comprising circumferential-seal engagement features circumferentially spaced apart around the mating section, each circumferential-seal engagement feature being configured to engage at least one end-seal engagement feature of the circumferential seal;

the inner end seal comprises an axially aligned ring section, an axially aligned cylindrical mating section extending outwardly from the ring section, and a central, axially aligned through-hole extending through the ring section and the mating section, the through-hole having an inner diameter at least slightly larger than the outer diameter of the shaft section of the outside end member and forming a gap between the through-hole and the shaft section of the outside end member, the gap being in fluid communication with the fluid-input connection of the outside end member, the mating section comprising circumferential-seal engagement features circumferentially spaced apart around the mating section and configured to engage with at least one end-seal engagement feature of the circumferential seal;

the end-seal engagement features and the circumferential-seal engagement features cooperate to prevent relative movement between the circumferential seal and the outer end seal, and between the circumferential seal and the inner end seal; and the circumferential seal has an outer diameter greater than an inner diameter of the drum;

slidably engaging the inner assembly with an outside end member having an outer disk section, an inwardly extending shaft section having an axial bore extending through the outer disk section and the shaft section, the bore being sized to surround and engage the shaft, and the shaft section having an axial dimension at least slightly less than a corresponding axial dimension of the inner assembly, so that the outer end seal and the inner end seal engage the outside end member and the inside end member in an interference fit in the axial direction, the outside end member having a pressurized-fluid connection comprising a fluid passage passing through the outer disk section;

aligning the outside end member, with the inner assembly engaged on the shaft section, with the inside end member;

forcing the outside end member axially toward the inside end member, engaging the circumferential seal with the drum in an interference fit in the radial direction; and fluidly connecting a compressed-gas source to the pressurized-fluid connection of the outside end member;

such that upon a rotation of the drum about the shaft, the circumferential seal, the outer end seal, and the inner end seal rotate with the drum about the shaft, while the outside end member and the inside end member remain stationary with respect to the shaft.

* * * * *